United States Patent
Krauss et al.

(10) Patent No.: US 8,230,885 B2
(45) Date of Patent: Jul. 31, 2012

(54) FLUID DUCT, AND FLEXIBLE PIPE FOR A FLUID DUCT

(75) Inventors: Manfred Krauss, Hettstadt (DE); Soeren Schroeter, Hallstadt (DE)

(73) Assignee: Fraenkische Rohrwerke Gebr. Kirchner GmbH & Co. KG, Koenigsberg (DE)

( * ) Notice: Subject to any disclaimer, the term of this patent is extended or adjusted under 35 U.S.C. 154(b) by 370 days.

(21) Appl. No.: 12/296,036

(22) PCT Filed: Apr. 5, 2007

(86) PCT No.: PCT/EP2007/003122
§ 371 (c)(1),
(2), (4) Date: May 13, 2009

(87) PCT Pub. No.: WO2007/115800
PCT Pub. Date: Oct. 18, 2007

(65) Prior Publication Data
US 2009/0308479 A1  Dec. 17, 2009

(30) Foreign Application Priority Data
Apr. 5, 2006 (DE) .................. 20 2006 005 545 U

(51) Int. Cl.
*F16L 11/00* (2006.01)
(52) U.S. Cl. ......... 138/121; 138/109; 138/122; 285/903
(58) Field of Classification Search .......... 138/121, 138/122, 109; 285/903
See application file for complete search history.

(56) References Cited

U.S. PATENT DOCUMENTS

| | | | |
|---|---|---|---|
| 2,333,349 A * | 11/1943 | Weatherhead, Jr. et al. .... | 29/506 |
| 3,926,222 A * | 12/1975 | Shroy et al. .................. | 138/122 |
| 4,151,864 A * | 5/1979 | Thurman .................... | 138/106 |
| 4,516,573 A | 5/1985 | Gedeon | |
| 4,852,564 A * | 8/1989 | Sheridan et al. ......... | 128/202.27 |
| 5,267,757 A | 12/1993 | Dal Palu | |
| 5,505,495 A * | 4/1996 | Godeau .............................. | 285/3 |
| 5,749,995 A * | 5/1998 | Godeau ......................... | 156/242 |
| 5,829,483 A | 11/1998 | Tukahara et al. | |
| 5,864,938 A * | 2/1999 | Gansel et al. ................. | 29/506 |
| 5,983,950 A | 11/1999 | Aoki et al. | |
| 6,199,920 B1 * | 3/2001 | Neustadtl ...................... | 285/322 |
| 6,793,997 B2 * | 9/2004 | Schmitz ....................... | 428/36.9 |
| 7,849,884 B2 * | 12/2010 | Dickel .......................... | 138/109 |

FOREIGN PATENT DOCUMENTS

| | | |
|---|---|---|
| DE | 28 24 395 | 12/1979 |
| DE | 42 21 926 | 1/1994 |
| DE | 43 15 175 | 11/1994 |
| DE | 198 11 019 | 9/1999 |
| FR | 2 702 991 | 9/1979 |
| FR | 2 533 996 | 4/1984 |
| GB | 2 116 434 | 9/1983 |
| GB | 2 244 671 | 12/1991 |
| WO | 97/21053 | 6/1997 |

* cited by examiner

*Primary Examiner* — Patrick F Brinson
(74) *Attorney, Agent, or Firm* — Greenblum & Bernstein, P.L.C.

(57) ABSTRACT

The invention relates to a fluid duct (10), especially for use in motor vehicles to feed liquid in order to wipe windows or headlights of said motor vehicle. Said fluid duct (10) comprises a flexible pipe (12) with at least one corrugated pipe section (22) and at least one plain pipe section (24) that adjoins the corrugated pipe section (22), at least one pipe joint (16, 20) with a pipe connecting section (26) which is inserted into a plain pipe section (24), and a support sleeve (36) for each pipe joint (16, 20). The support sleeve (36) surrounds the plain pipe section (24) receiving the pipe connecting section (26) and presses the plain pipe section (24) against the pipe connecting section (26).

25 Claims, 2 Drawing Sheets

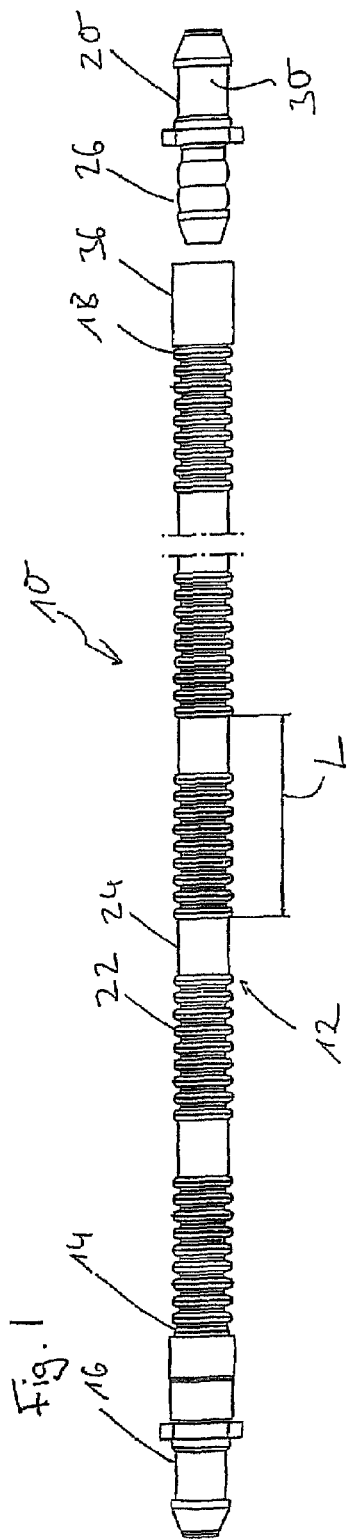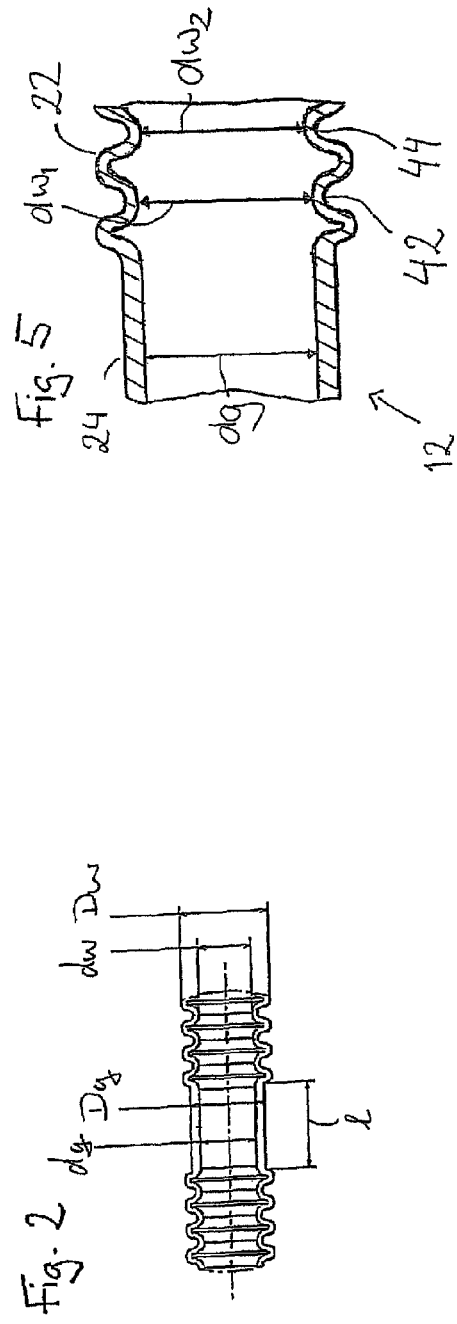

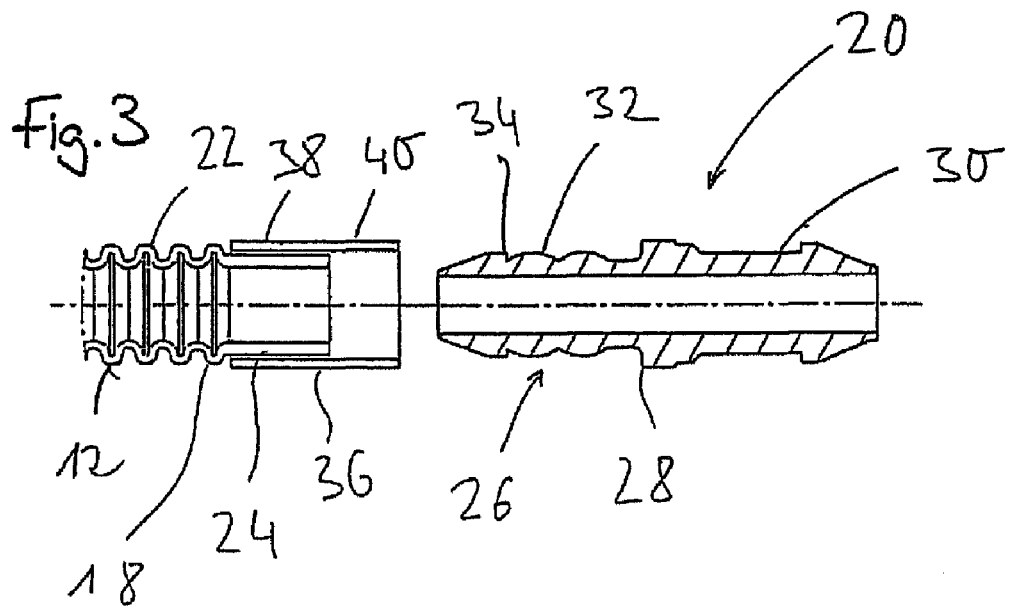
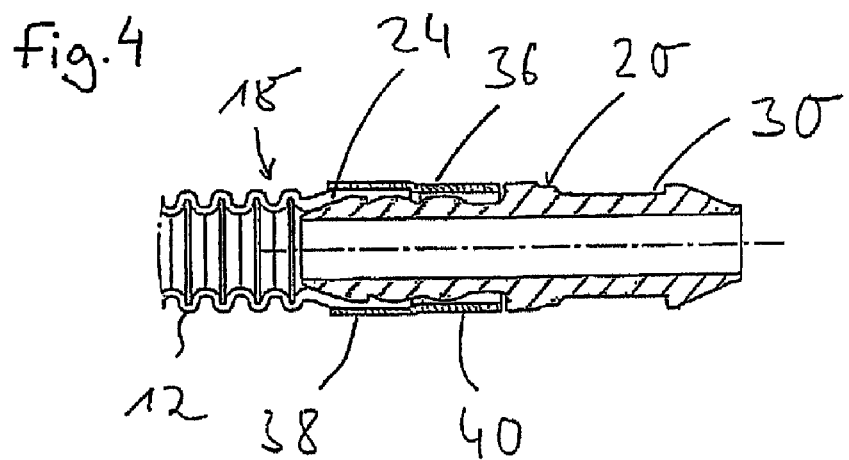

FLUID DUCT, AND FLEXIBLE PIPE FOR A FLUID DUCT

CROSS-REFERENCE TO RELATED APPLICATIONS

The present application is a U.S. National Stage of International Patent Application No. PCT/EP2007/003122 filed Apr. 5, 2007, and claims priority of German Patent Application No. 20 2006 005 545.2 filed Apr. 5, 2006. Moreover, the disclosure of International Patent Application No. PCT/EP2007/003122 is expressly incorporated by reference herein in its entirety.

BACKGROUND OF THE INVENTION

1. Field of the Invention

The present invention relates to a fluid duct as can be used, for example, in motor vehicles in order to supply liquid for cleaning motor vehicle windows or for cleaning motor vehicle headlights. Furthermore, the present invention relates to a flexible conduit pipe which can be used for a fluid duct of this type.

2. Discussion of Background Information

DE 198 11 019 A1 discloses a fluid duct in which a flexible conduit pipe comprises a plurality of mutually alternating corrugated pipe sections and smooth pipe sections. The conduit pipe, which is produced from a flexible plastics material in a continuously running extrusion operation, is used in order to conduct liquid from a liquid reservoir to the spray nozzles of a window or headlight washing system in a motor vehicle. In order to produce the connection of the spray nozzles to the flexible conduit pipe, the latter is separated approximately centrally in a smooth pipe section such that two pipe sections are produced, of which each ends with a smooth pipe section which is approximately half the length of the smooth pipe sections which are in principle provided on a flexible conduit pipe of this type. The spray nozzle or an element then to be coupled to a smooth pipe section of this type can then be pushed into a smooth pipe section of this type.

SUMMARY OF THE INVENTION

The present invention provides a fluid duct and a flexible pipe for a fluid duct of this the type generally described above, respectively, which can be produced cost-effectively and permit reliable transportation of fluid and a reliable connection to other regions of the system.

According to a first aspect of the present invention, a fluid duct, in particular for use in motor vehicles for supplying liquid for cleaning motor vehicle windows or for cleaning motor vehicle headlights, includes a flexible conduit pipe with at least one corrugated pipe section and at least one smooth pipe section adjoining the corrugated pipe section, at least one duct connector with a pipe connecting section which is inserted into a smooth pipe section, and a supporting sleeve for each duct connector. The supporting sleeve surrounds the smooth pipe section, which receives the conduit pipe connecting section, and the smooth pipe section presses against the conduit pipe connecting section.

In a fluid duct according to the invention, a duct connector which is to be coupled to a smooth pipe section of a flexible conduit pipe is therefore not only pushed into it or onto it. What is more, it is ensured by the use of a supporting sleeve assigned to a duct connector of this type that that section of the flexible conduit pipe which is to be coupled to the duct connector, i.e., a smooth pipe section, is pressed fixedly against the conduit pipe connection section.

Since the supporting sleeve therefore ensures the fixed connection, the flexible conduit pipe can be constructed from less firm, for example, more flexible, material, which is advantageous with regard to production costs and rules out the risk of the flexible conduit pipe kinking due to material which is too rigid.

Since, in the case of the construction according to the invention of a fluid duct, the supporting sleeve makes a substantial contribution to the fixed connection between the flexible conduit pipe and a duct connector, it can furthermore be provided that the smooth pipe section has a predetermined length which is shorter than the length of the conduit pipe connecting section inserted therein.

In such an arrangement, it is then advantageously provided that a first sleeve section of the supporting sleeve surrounds the smooth pipe section and a second sleeve section bears against that region of the conduit pipe connecting section which is not covered by the smooth pipe section. In this manner, in spite of the smooth pipe section being of comparatively short configuration, the entire length of the conduit pipe connecting section can be used to produce a fixed connection between the flexible conduit pipe and the duct connector.

In an alternative embodiment which is advantageous especially for duct connectors of comparatively short construction, it can be provided that the length of the supporting sleeve substantially corresponds to the length of the smooth pipe section surrounded thereby.

In order to ensure sufficient flexibility over the entire length of the flexible conduit pipe and therefore to reduce the risk of it kinking, it is proposed that the flexible conduit pipe comprises a plurality of corrugated pipe sections and/or a plurality of smooth pipe sections following one another in a mutually alternating manner. In this case, it can then furthermore be provided that all of the smooth pipe sections of the flexible conduit pipe substantially have the predetermined length.

The flexible conduit pipe can be constructed, for example, from polypropylene material. This means that, for the flexible conduit pipe, comparatively cost-effective construction material is used which, owing to its high degree of flexibility, furthermore ensures good deformability.

In order to be able to ensure the required stable coupling in the region of the connection of the flexible conduit pipe to a duct connector, it is furthermore proposed that the supporting sleeve is constructed from polyamide material, preferably PA-6.

The duct connector may be constructed from polyoxymethylene material (POM).

According to a further aspect, a flexible conduit pipe which can be used, for example, for a fluid duct described previously. The pipe comprises a plurality of corrugated pipe sections and a plurality of smooth pipe sections following one another in a mutually alternating manner. The ratio of the length of the corrugated pipe section to the length of the smooth pipe section is greater than 1.2.

As already explained at the beginning, flexible conduit pipes of this type are generally produced in a continuous manufacturing process by extrusion. In this case, the transition of smooth pipe sections to corrugated pipe sections is critical, since there is the risk here of forming thin regions with bubbles being enclosed and therefore of impairing the quality. In order to counter this problem, a flexible conduit pipe can be provided, according to a further aspect that can especially also be used in conjunction with a previously described fluid duct. This flexible conduit pipe includes at least one corrugated pipe section and at least one smooth pipe section adjoining the corrugated pipe section. An inside diameter of the first inner shaft of the corrugated pipe section following the smooth pipe section is larger than the inside diameter of inner shafts of the corrugated pipe section located further away from the smooth pipe section.

It has been shown that by such a gradual decrease in the inside diameters of the inner shafts of the corrugated pipe section, the problem of forming thin regions, the problem arising from the transition of smooth pipe section/corrugated pipe section, can be eliminated and therefore a flexible conduit pipe of high strength over its entire length can be produced.

Also in the case of such a configuration of the flexible conduit pipe, it can be provided that it has a plurality of corrugated pipe sections and a plurality of smooth pipe sections, corrugated pipe sections and smooth pipe sections following one another in a mutually alternating manner, and the ratio of the length of the corrugated pipe section to the length of the smooth pipe section being greater than 1.2.

The provision of this ratio of the length of the corrugated pipe sections to the length of the smooth pipe sections ensures that a substantial portion of the length of the flexible conduit pipe is formed by corrugated pipe sections which primarily ensure adequate flexibility. This is advantageous in particular in conjunction with the fluid duct defined previously, since the latter, owing to the designated type of connection of the flexible conduit pipe to a duct connector, also permits comparatively short smooth pipe sections.

A ratio of the lengths which is greater than 2.5, but is preferably less than 4 has proven particularly advantageous. The upper limit for the ratio of the length of the corrugated pipe sections to the length of the smooth pipe sections ensures that smooth pipe sections are present sufficiently frequently between individual corrugated pipe sections. This also permits the construction of comparatively short fluid ducts from a flexible conduit pipe produced in an endless method. As already explained above, it is particularly advantageous if the flexible conduit pipe is constructed from polypropylene material.

In particular when a flexible conduit pipe is used for supplying liquid to the nozzles of a window washing system, it is advantageous if the inside diameter of the smooth pipe sections lies within the range of 4 to 5 mm. It has been shown that, with such a dimensioning, a sufficient cavity is provided for conveying liquid to the spray nozzles of a window washing system, with the pressure ratios prevailing in such systems being taken into consideration, of course.

If a flexible conduit pipe according to the invention is to be used for supplying liquid to the spray nozzles of a headlight washing system, then it is particularly advantageous if the inside diameter of the smooth pipe sections lies within the range of 8 to 9 mm. A relatively large volume is therefore provided here for the passage of the liquid to be conveyed, which is particularly advantageous, since, in the case of headlight washing systems, a large pressure has to be built up within a comparatively short time, the pressure requiring correspondingly greater volumes than is the case, for example, in the region of the window washing systems.

Furthermore, it can be provided that the inside diameter of the corrugated pipe sections is smaller than the inside diameter of the smooth pipe sections.

At this juncture, it should be pointed out that the fluid duct according to the invention and the flexible conduit pipe according to the invention for such a fluid duct can be used not only in order to supply liquid for cleaning motor vehicle windows or for cleaning motor vehicle headlights, but also for conducting gases or gas mixtures, for example air and/or mixtures of air with other gases, for example for ventilation and/or venting purposes.

Embodiments of the invention are directed to a fluid duct that includes a flexible conduit pipe having a plurality of corrugated pipe sections and a plurality of smooth pipe sections arranged to follow one another in a mutually alternating manner, and at least one duct connector having a conduit pipe connecting section insertable into one of the plurality of smooth pipe sections. The one smooth pipe section has a predetermined length shorter than a length of the conduit pipe connection section insertable into the one smooth pipe section. A supporting sleeve for each at least one duct connector is dimensioned to be longer than the one smooth pipe section, and supporting sleeve includes a first sleeve section positionable to surround the one smooth pipe section and a second sleeve section positionable to bear against a portion of the conduit pipe connecting section that is not insertable into the one smooth pipe section. When the at least one duct connector is inserted, the one smooth pipe section presses radially outwardly against an inner surface of the first sleeve section, whereby the supporting sleeve presses the smooth pipe section against the conduit pipe connecting section.

According to aspects of the embodiments, the fluid duct can be structured and arranged to supply liquid for at least one of cleaning motor vehicle windows or cleaning motor vehicle headlights.

In accordance with other aspects, an assembly including the one smooth pipe section and the supporting sleeve may be formed prior to inserting the at least one duct connector.

According to embodiments, all of the plurality of smooth pipe sections substantially can have a same predetermined length.

In accordance with embodiments, the flexible conduit pipe can include a polypropylene material. In other embodiments, the supporting sleeve may include a polyamide material such as PA-6. in further embodiments, the duct connector can include a polyoxymethylene material.

Embodiments of the invention are directed to a flexible conduit pipe that includes a plurality of corrugated pipe sections and a plurality of smooth pipe sections. The plurality of corrugated pipe sections and the plurality of smooth pipe sections are arranged to follow one another in a mutually alternating manner, and a ratio of a length of one of the plurality of corrugated pipe sections to a length of the one of the plurality of smooth pipe section is greater than 1.2.

In accordance with embodiments, the ratio may be greater than 2.5. Further, the ratio can be less than 4.

According to aspects of the embodiments, the flexible conduit pipe can include a polypropylene material.

In embodiments, an inside diameter of the smooth pipe sections can be within a range of 4 to 5 mm. In other embodiments, an inside diameter of the smooth pipe sections may be within a range of 8 to 9 mm. According to further embodiments, a minimum inside diameter of the one corrugated pipe section can be smaller than an inside diameter of the one smooth pipe section.

Embodiments of the invention are directed to a flexible conduit pipe that includes at least one corrugated pipe section and at least one smooth pipe section adjoining the at least one corrugated pipe section. An inside diameter of a first inner shaft of the at least one corrugated pipe section that follows the at least one smooth pipe section is larger than an inside diameter of a second inner shaft of the at least one corrugated pipe section that is located further away from the smooth pipe section than the first inner shaft.

In accordance with still yet other embodiments, the at least one corrugated pipe section can include a plurality of corrugated pipe sections and the at least one smooth pipe section comprises a plurality of smooth pipe sections, such that the corrugated pipe sections and the smooth pipe sections follow one another in a mutually alternating manner, and wherein a ratio of a length of one of the plurality of corrugated pipe sections to a length of one of the plurality of smooth pipe section is greater than 1.2.

BRIEF DESCRIPTION OF THE DRAWINGS

The present invention is described in detail below with reference to the attached drawings, in which:

FIG. 1 illustrates a view of a fluid duct according to the invention;

FIG. 2 illustrates a section, which is illustrated in longitudinal section, of a flexible conduit pipe;

FIG. 3 illustrates an end section of a flexible conduit pipe before the connection to a duct connector is produced;

FIG. 4 illustrates the end section, illustrated in FIG. 3, of the conduit pipe after connection to the duct connector has been produced;

FIG. 5 illustrates a partial longitudinal sectional view of a flexible conduit pipe.

DETAILED DESCRIPTION OF THE EMBODIMENTS OF THE INVENTION

In FIG. 1, a fluid duct is denoted in general by 10. The fluid duct 10 can be used, for example, to convey liquid in motor vehicles from a liquid reservoir to the spray nozzles of a window washing system or of a headlight washing system. It should be pointed out here that, of course, use in other regions, for example for conducting fuel or for conducting gaseous media, is also conceivable. Of course, use in spheres other than in motor vehicles is also conceivable.

The fluid duct 10 comprises a flexible conduit pipe 12 which, in the example illustrated, is already connected at its end region 14 to a duct connector 16 and the end region 18 of which is not yet connected to a duct connector 20. The flexible conduit pipe 12 has a plurality of corrugated pipe sections 22 and smooth pipe sections 24. The corrugated pipe sections 22 and the smooth pipe sections 24 follow one another in an alternating manner. The flexible conduit pipe 12 is produced, for example, from polypropylene material and therefore has a high degree of flexibility while having a comparatively cost-effective construction. The flexible conduit pipe 12 can be produced as an endless pipe in an extrusion process, and the length then required for constructing a certain fluid line can be cut off from a pipe which is rolled up, for example, onto a reel. In particular if the flexible conduit pipe 12 is to be coupled at both end regions 14 and 18 to a respective duct connector 16, 20, the required length is severed from the remaining strand in such a manner that there is a smooth pipe section 24 at each end region 14, 18, the section then being coupled in a manner yet to be described below to a respective duct connector 16 or 20. In order then to be able to use the remaining part of the flexible conduit pipe in a corresponding manner, a corrugated pipe section 22 first of all has to be severed therefrom such that the part begins again with a smooth pipe section.

If a flexible conduit pipe 12 of this type is to be used, for example, for constructing a fluid duct 10 which is to be used for supplying liquid to the spray nozzles of a window washing system, the flexible conduit pipe 12 can be produced with dimensions which are particularly advantageous for this intended use. It has thus been shown that it is advantageous if the overall length L of a length section of the flexible conduit pipe 12, which length section comprises a corrugated pipe section 22 and a smooth pipe section 24, lies in the region of approximately 25 mm, with the length l of a smooth pipe section 24 then advantageously being around approximately 7 mm. For this intended purpose, it has furthermore proven advantageous if the inside diameter dg of one smooth pipe section 24 or of all of the smooth pipe sections 24 lies in the region of 4.7 mm while, in order to provide sufficient wall thickness and stability, respectively, in the region of the smooth pipe sections 24, the outside diameter Dg in this region can be around approximately 6 mm. The minimum inside diameter dw of a respective corrugated pipe section 22 can be around approximately 4.5 mm, i.e. is generally somewhat smaller than the inside diameter dg of a smooth pipe section 24 while the maximum outside diameter Dw of the corrugated pipe section 22 can be around approximately 7.1 mm.

With the above dimensional specifications, a flexible conduit pipe 12 is therefore produced, the pipe firstly providing a sufficient volume in order to be able to conduct the required amount of liquid under the prevailing pressure conditions to the spray nozzles of a window washing system. Secondly, owing to the length ratio provided for the corrugated pipe sections 22 and the smooth pipe sections 24, a sufficient degree of flexibility of the flexible conduit pipe 12 is ensured. It can be seen that, at the stated dimensions, the ratio has a value of approximately 2.5. The larger the ratio is, the greater is the length portion of the corrugated pipe sections 22 and therefore also the flexibility of the conduit pipe 12. However, if the corrugated pipe sections 22 are too long, this brings problems for the requirement of constructing comparatively short fluid lines, since severing of the flexible conduit pipe is generally possible or expedient only in the region of smooth pipe sections 24.

If a flexible conduit pipe 12 of this type or a fluid duct constructed therewith is to be used in the region of a headlight cleaning system, i.e. is to conduct liquid from a liquid reservoir to the spray nozzles of a headlight washing system, then it has proven advantageous to configure the smooth pipe sections 24 with an inside diameter dg of 8.5 mm and an outside diameter Dg of 10.5 mm. In this case, the corrugated pipe sections 22 can have a minimum inside diameter dw of 7.5 mm and a maximum outside diameter Dw of 12.75 mm. In the case of such a flexible conduit pipe 12 of larger dimensions, the length of the corrugated pipe sections 22 can then be in the region of 15 mm while the smooth pipe sections 24 can have a length l in the region of 12 mm. The ratio of the length of the corrugated pipe sections 22 to the length of the smooth pipe sections 24 of approximately 1.25 is therefore produced here. Although the portion of corrugated pipe sections 22 to the overall length L is somewhat smaller here, owing to the larger overall size of the flexible conduit pipe 12 and in particular also owing to the use of a highly flexible construction material, namely polypropylene, there is also virtually no risk in this configuration of the flexible conduit pipe 12 kinking at the curvatures which can generally be expected upon installation.

In order to be able to integrate the above-described flexible conduit pipe 12 into an overall system, i.e. in order to be able to provide the fluid duct 10 illustrated in FIG. 1 with the duct connectors 16, 20, a connection, which is explained in detail below using the duct connector 20 and with reference to FIGS. 3 and 4, is produced between the flexible conduit pipe 12 and the duct connectors 16, 20.

The duct connector 20 which is essentially divided into two regions is seen in FIG. 3. A conduit pipe connecting section 26 serves for the coupling to the flexible conduit pipe 12 while a connecting section 30 which adjoins the conduit pipe connecting section 26 via a shoulder region 28 serves to couple the duct connector 20 or the overall fluid duct 10, for example to a fluid pump, a fluid reservoir or other regions of the system. In the example illustrated, the pipe connecting section 26 is constructed in a corrugated manner on its surface 32 and provides a shoulder 34 in its free end region. By the shaping or structuring, it is attempted to produce not only frictional contact with the flexible conduit pipe 12 but also to generate a type of form-fitting connection by the intermeshing of the duct connector 20 with the material of the flexible conduit pipe 12.

As already explained above, in order to produce the fluid duct the flexible conduit pipe 12 is provided in such a manner that it has a complete smooth pipe section 24 in its respective end regions, here in the end region 18. It is seen in FIG. 3 that the smooth pipe section 24 or all of the smooth pipe sections 24 present on the flexible pipe 12 has or have a length which is significantly shorter than the length of the conduit pipe connecting section 26 of the duct connector 20. If the duct connector 20 is pushed by pipe connecting section 26 into the smooth pipe section 24 provided at the end region 18 to such an extent that it only lies in the smooth pipe section 24, but no longer engages in the corrugated pipe section 22 then following it, then the situation which can be seen in FIG. 4 is produced, i.e., the smooth pipe section 24 only covers a partial region of the conduit pipe connecting section 26. In this region, owing to suitable relative dimensioning, i.e. oversizing of the conduit pipe connecting section 26 in comparison to the internal size of the smooth pipe section 24, the smooth pipe section 24 bears under prestress against the surface of the conduit pipe connecting section 26 such that the "toothing" which can also be seen in FIG. 4 is produced with the surface structuring, in particular of the shoulder 34.

Since, however, in the case of the flexible conduit pipe 12 constructed according to the invention, the smooth pipe sections 24 are of comparatively short design in order to ensure sufficient flexibility and, furthermore, the flexible conduit pipe 12 is constructed from a highly elastic material, for example polypropylene material, a supporting sleeve 36 is also provided for the fixed coupling of the flexible conduit pipe 12 to the duct connector 20. In the exemplary embodiment illustrated, the supporting sleeve is dimensioned in such a manner that it is longer than the smooth pipe section 24. A first sleeve section 38 of the supporting sleeve 36 bears against the outer surface of the smooth pipe section 24 in a manner covering the latter and therefore presses it to a greater extent against the conduit pipe connecting section 26. A second sleeve section 40 of the supporting sleeve 36 extends beyond the smooth pipe section 24, to be precise preferably as far as the shoulder 28 formed on the duct connector 20. The second sleeve section 40 of the supporting sleeve 36 can bear against the outer surface of the conduit pipe connecting section 26 and covers the latter. Since the supporting sleeve 36 is constructed from substantially stronger and more rigid material in comparison to the construction material of the flexible conduit pipe, for example, polyamide material, and since the supporting sleeve 36 is dimensioned in such a manner that, when the duct connector 20 is pushed into the assembly formed from the smooth pipe section 24 and supporting sleeve 36, the smooth pipe section 24 is pressed radially outward against the inner surface of the first sleeve section 38, a very firm and especially fluid-tight connection of the flexible conduit pipe 12 to the duct connector 20 is produced even at comparatively high ambient temperatures. This is further assisted in that, in the second sleeve section 40, the supporting sleeve 36 can bear against the outer surface of the duct connector when a corresponding relative dimensioning between the supporting sleeve 36 and the conduit pipe connecting section 26 is provided.

In order to facilitate the installation of a previously described fluid duct 10, it may be advantageous to combine the flexible conduit pipe 12 with a supporting sleeve 36, which is to be provided on a respective end region 14 and/or 18, to form a preassembled subassembly and then to insert the duct connector 20 by its conduit pipe connecting section 26 into the subassembly. In the preinstallation situation, inadvertent displacement or falling off of a respective supporting sleeve 36 can be prevented, for example, by the supporting sleeve 36 having a slightly smaller inside diameter in comparison to the outside diameter of the smooth pipe section 24 and therefore being held on the smooth pipe section 24 by a frictional connection. In an alternative variant, the inner surface of the supporting sleeve can have one or more radially inwardly directed bulges, for example in the form of spherical-dome-like bulges or else elongated ribs or the like which are dimensioned in such a manner that they bear under slight pressure against the outer surface of a smooth pipe section 24, but, in the connecting state produced to the duct connector 20, do not impair the functionality of the supporting sleeve, i.e. the pressing of the smooth pipe section 24 onto the outer surface of the conduit pipe connecting section 26.

In the above-described manner of fixedly coupling the flexible conduit pipe 12 to one or more duct connectors 16 and/or 20, in spite of smooth pipe sections 24 being of comparatively short configuration, the use of the supporting sleeve 36 results in a stable coupling which is visually attractive, in particular if the conduit pipe connecting section 26 is not completely covered by a smooth pipe section 24, and in which the visual impression cannot be given that the flexible conduit pipe 12 has been at least partially detached from the duct connector 20 due to a conduit pipe connecting section 26 not being fully pushed into the flexible pipe 12. In this type of coupling, the use of a conduit pipe which is constructed from flexible material and is highly flexible on account of its shaping, i.e., on account of the provision of comparatively short smooth pipe sections, is especially possible. This is of particular advantage in particular for the above-stated intended uses, the advantage being extended even further if a fluid duct of this type is used to conduct liquid to a spray nozzle which is attached to a moving wiper.

An alternative variant embodiment of a flexible conduit pipe 12 is illustrated in FIG. 5. The transition of a smooth pipe section 24 to a corrugated pipe section 22 with the two first inner shafts 42, 44 following the smooth pipe section 24 is seen here. It is seen that the first inner shaft 42 of the corrugated pipe section 22, the inner shaft following the smooth pipe section 24, has an inside diameter $dw_1$ which is slightly larger than the inside diameter $dw_2$ of the second inner shaft 44 or of the inner shafts then following it. By this gradual decrease in the inside diameter dw of the inner shafts in the direction away from a respective smooth pipe section 24, it is ensured that, during the manufacturing process, no thin regions that could have an adverse effect on the structural strength of the flexible conduit pipe 12 are produced in the transition region from the smooth pipe section 24 to the corrugated pipe section 22. For example, if the minimum inside diameter dw in the corrugated pipe section 22, which inside diameter can be provided, for example, starting from the second inner shaft 44, is in the range of from 7.5 to 7.8 mm, the inside diameter $dw_1$ of the first inner shaft 42 is around approximately 8 to 8.1 mm, i.e. is still somewhat smaller than the inside diameter dg of the smooth pipe section 24, which can be in the range of from 8.3 to 8.5 mm. Of course, a corresponding graduation of diameters can also be provided in flexible conduit pipes 12 having different dimensions. Furthermore, it is also possible, as an alternative or in addition to this reduction of the inside diameter, also to allow the outside diameter of the outside shafts of a corrugated pipe section 22, the outside shafts following a respective smooth pipe section 24, to increase gradually or in a stepped manner.

It goes without saying that a fluid duct according to the invention and a flexible conduit pipe constructed according to the invention, respectively, may be configured differently, in various aspects, than depicted above. For example, the supporting sleeve 36 could have a length which substantially corresponds to the length of the smooth conduit pipe section 24 to be fixed by it to a duct connector 20. This is appropriate in particular if, in adaptation to certain lengths l of smooth pipe sections, even shorter conduit pipe connecting sections 26 to specially designed duct connectors 20 are used. Also in this case, the smooth pipe section 24 is pressed fixedly against the outer circumference of the conduit pipe connecting section 26 by the comparatively rigid supporting sleeve 36 which is insensitive to heat and is of shorter design.

The invention claimed is:

1. A fluid duct comprising:
a flexible conduit pipe having a plurality of corrugated pipe sections and a plurality of smooth pipe sections arranged to follow one another in a mutually alternating manner;
at least one duct connector having a conduit pipe connecting section insertable into one of the plurality of smooth pipe sections, the one smooth pipe section having a predetermined length shorter than a length of the conduit pipe connection section insertable into the one smooth pipe section;
a supporting sleeve for each at least one duct connector being dimensioned to be longer than the one smooth pipe section, the supporting sleeve comprising:
in an uninstalled state, a cylindrical inside surface extending between opposite open ends;
a first sleeve section positionable to surround the one smooth pipe section; and
a second sleeve section positionable to bear against a portion of the conduit pipe connecting section that is not insertable into the one smooth pipe section,
wherein, when the at least one duct connector is inserted by pushing it into the one smooth pipe section, the one smooth pipe section is pressed radially outwardly against an inner surface of the first sleeve section by the pushing, whereby the supporting sleeve presses the smooth pipe section against the conduit pipe connecting section.

2. The fluid duct in accordance with claim 1, wherein the fluid duct is structured and arranged to supply liquid for at least one of cleaning motor vehicle windows or cleaning motor vehicle headlights.

3. The fluid duct in accordance with claim 1, wherein an assembly comprising the one smooth pipe section and the supporting sleeve is formed prior to inserting the at least one duct connector.

4. The fluid duct in accordance with claim 1, wherein all of the plurality of smooth pipe sections substantially have a same predetermined length.

5. The fluid duct in accordance with claim 1, wherein the flexible conduit pipe comprises a polypropylene material.

6. The fluid duct in accordance with claim 1, wherein the supporting sleeve comprises a polyamide material.

7. The fluid duct in accordance with claim 6, wherein the polyamide material is PA-6.

8. The fluid duct in accordance with claim 1, wherein the duct connector comprises a polyoxymethylene material.

9. A flexible conduit pipe comprising:
a plurality of corrugated pipe sections;
a plurality of smooth pipe sections; and
a supporting sleeve for connecting the pipe having a greater length than one of the smooth pipe sections,
wherein the plurality of corrugated pipe sections and the plurality of smooth pipe sections are arranged to follow one another in a mutually alternating manner, and a ratio of a length of one of the plurality of corrugated pipe sections to a length of one of the plurality of smooth pipe sections arranged between two corrugated pipe sections is greater than 1.2.

10. The flexible conduit pipe in accordance with claim 9, wherein the ratio is greater than 2.5.

11. The flexible conduit pipe in accordance with claim 9, wherein the ratio is less than 4.

12. The flexible conduit pipe in accordance with claim 9, wherein the flexible conduit pipe comprises a polypropylene material.

13. The flexible conduit pipe in accordance with claim 9, wherein an inside diameter of the smooth pipe sections is within a range of 4 to 5 mm.

14. The flexible conduit pipe in accordance with claim 9, wherein an inside diameter (dg) of the smooth pipe sections is within a range of 8 to 9 mm.

15. The flexible conduit pipe in accordance with claim 9, wherein a minimum inside diameter of the one corrugated pipe section is smaller than an inside diameter of the one smooth pipe section.

16. A flexible conduit pipe, comprising:
at least one corrugated pipe section; and
at least one smooth pipe section adjoining the at least one corrugated pipe section,
wherein an inside diameter of a first inner shaft of the at least one corrugated pipe section that follows the at least one smooth pipe section is larger than an inside diameter of a second inner shaft of the at least one corrugated pipe section that is located further away from the smooth pipe section than the first inner shaft.

17. The flexible conduit pipe in accordance with claim 16, wherein the at least one corrugated pipe section comprises a plurality of corrugated pipe sections and the at least one smooth pipe section comprises a plurality of smooth pipe sections, such that the corrugated pipe sections and the smooth pipe sections follow one another in a mutually alternating manner, and wherein a ratio of a length of one of the plurality of corrugated pipe sections to a length of one of the plurality of smooth pipe section is greater than 1.2.

18. The flexible conduit pipe in accordance with claim 9, wherein the supporting sleeve is sized to apply a frictional engagement or pressure against one of the smooth pipe sections in an uninstalled state.

19. The flexible conduit pipe in accordance with claim 9, wherein the flexible conduit pipe is a flexible washing fluid conduit pipe.

20. The fluid duct in accordance with claim 1, wherein, prior to installation of the at least one duct connector, the supporting sleeve has an inside diameter smaller than an outside diameter of the one smooth pipe section such that the installed supporting sleeve does not inadvertently fall off.

21. A fluid duct comprising:
a flexible conduit pipe having a plurality of corrugated pipe sections and a plurality of smooth pipe sections arranged to follow one another in a mutually alternating manner;

at least one duct connector having a conduit pipe connecting section insertable into one of the plurality of smooth pipe sections, the one smooth pipe section having a predetermined length shorter than a length of the conduit pipe connection section insertable into the one smooth pipe section;

a supporting sleeve for each at least one duct connector being dimensioned to be longer than the one smooth pipe section, the supporting sleeve comprising:

a first sleeve section positionable to surround the one smooth pipe section; and a second sleeve section positionable to bear against a portion of the conduit pipe connecting section that is not insertable into the one smooth pipe section, wherein, when the at least one duct connector is inserted by pushing it into the one smooth pipe section, the one smooth pipe section is pressed radially outwardly against an inner surface of the first sleeve section by the pushing, whereby the supporting sleeve presses the smooth pipe section against the conduit pipe connecting section, wherein the second sleeve section positionable to bear against a portion of the conduit pipe connecting section is not connected to the portion of the conduit pipe connecting section.

22. The fluid duct in accordance with claim 21, wherein, in an uninstalled state, each of the first and second sleeve sections has a cylindrical inside surface.

23. The fluid duct in accordance with claim 21, wherein, in an uninstalled state, the supporting sleeve has a cylindrical outside surface.

24. The fluid duct in accordance with claim 1, wherein the at least one duct connector is connected to the flexible conduit pipe via frictional engagement:

between the first sleeve section and the one smooth pipe section; and between the one smooth pipe section and the at least one duct connector.

25. The fluid duct in accordance with claim 9, wherein, in an uninstalled state, the supporting sleeve has a cylindrical inside surface that is axially longer than the one of the smooth pipe sections.

* * * * *